United States Patent Office

2,882,203
Patented Apr. 14, 1959

2,882,203

INJECTABLE INSULIN PREPARATION WITH PROTRACTED EFFECT

Karl Petersen, Copenhagen, and Jorgen Schlichtkrull and Knud Hallas-Möller, Holte, Denmark, assignors to Novo Terapeutisk Laboratorium A/S No Drawing. Application June 24, 1952
Serial No. 295,337

Claims priority, application Denmark June 26, 1951

4 Claims. (Cl. 167—75)

The importance of the presence of zinc in various insulin preparations for subcutaneous and intramuscular injection has been made the object of a number of chemical, biological and clinical tests.

Thus, it is known that a protracted therapeutic effect may be obtained by subcutaneous injection of dissolved insulin on rabbits, when the insulin solution contains large amounts of zinc. Hence, in order to obtain a protracted effect of importance it will be necessary to employ such considerable amounts of zinc (approximately 10–200 gamma per unit of insulin, corresponding to approximately 40–800 milligrams of zinc per 100 millilitres with 40 international units of insulin per millilitre) that by injection on human beings severe irritations appear on the site of injection, whereas it is also questionable whether such great amounts of zinc may safely be daily administered to the human organism. Insulin preparations, consisting of dissolved insulin with added zinc, have consequently not found any practical clinical use.

It is also known that protamine insulin preparations with an admixture of zinc have a considerable greater protracted effect than that of such preparations without an admixture of zinc. This observation has proved of great importance, and protamine insulin preparations with addition of zinc have found extensive practical clinical use.

Furthermore, it is known that a number of metals possess protein precipitating properties. For example, precipitated zinc hydroxide may be used for precipitation of proteins.

Insulin has thus been precipitated quantitatively by adding a zinc hydroxide precipitate, produced of zinc sulphate with caustic soda, to an acid insulin solution. The precipitate of insulin and basic zinc salt has experimentally been injected on animals, resulting in a more intensive and protracted insulin effect than that obtained with ordinary insulin. With greater amounts of zinc the metal seems, however, to neutralize the insulin effect. However, the clinical effect of these precipitates has not been tested, and no preparations suitable for clinical use have been produced on basis of the biological tests performed.

Finally, chemical tests have been performed on the ability of amorphously precipitated insulin to take up zinc with a view to the proportion of zinc to insulin in the pancreas glands. Partly zinc-free insulin, partly crystalline insulin has been utilized as starting material for these tests.

The zinc-free insulin has been produced from ordinary commercial insulin through a number of successive dissolving and precipitating processes with employment of, i.a. ammonium hydroxide and of ammonium acetate as a buffer in the precipitating steps as well as i.a. of lactic acid in the dissolving steps. It has then been tested how great a part of the zinc-free insulin is precipitated at the various pH values in the presence of 9.5 gamma of zinc per insulin unit, and how great a part of the zinc-free insulin is precipitated at pH 7.0 in the presence of varying amounts of zinc. It was found that at pH 7 as much as approximately 10 gamma of zinc per insulin unit were required in order to obtain complete precipitation of the insulin, and even with this zinc content approximately 5–15% of the insulin was found in solution at pH values under 7 and down to 4.5.

In the tests performed with crystalline insulin the crystalline insulin was dissolved in hydrochloric acid under addition of zinc chloride in varying amounts, and then adjusted with caustic soda to pH 6.5, whereafter the zinc content of the resulting precipitate was tested. The tests proved that the amorphous insulin precipitated by adjustment to pH 6.5 contained increasing amounts of zinc with increasing zinc concentration. None of the zinc-containing suspensions of amorphous insulin, formed by the mentioned chemical tests, have been tested, biologically or clinically, and none of the suspensions are suitable for practical clinical use.

The present invention relates to the production of injectable insulin preparations acting with protracted effect, and based on amorphously precipitated insulin. The invention is based on the following chemical observations:

(1) Amorphously precipitated insulin is not only able to bind zinc, but also other metals. Thus, if zinc is replaced by cobalt, nickel, cadmium, copper, manganese or iron, it will be found that these metals are taken up by the amorphous insulin in a corresponding manner as zinc, resulting in corresponding changes in the solubility of the insulin and resultant modified, biological effect.

(2) By adjustment of an acid solution of crystalline or amorphous insulin to pH approximately 7 it will be possible to have the insulin precipitated practically quantitatively in amorphous state in the presence of considerably less zinc than at the above mentioned biological tests, and at the chemical tests, in which zinc-free insulin was used as starting material. According to the invention, it has thus been found that the quantitative precipitation may already be attained when above approximately 0.6 gamma of zinc per insulin unit is present. Corresponding precipitations may also be obtained by employment of the above mentioned metals in an amount of the same order as that of the specified zinc amount. In other words, the fact is that it will be possible by adjustment to pH approximately 7 to have the insulin precipitated almost quantitatively in amorphous state when one or more of the mentioned metals are present in such an amount that the resultant suspension of amorphous insulin contains more than approximately $2 \times A \times 10^{-5}$ milliequivalents of the mentioned metals per millilitre of the suspension, where "A" denotes the number of international units of insulin per millilitre of the suspension.

(3) Furthermore, the chemical tests have surprisingly disclosed that it is not possible to produce a zinc insulin suspension according to the invention by the ordinary, known processes for producing neutral insulin preparations with protracted effect. Experimental preparations, containing zinc and insulin, and furthermore produced according to the known processes (addition of isotonic, buffer and preserving agent under aseptic conditions), have almost the same effect as ordinary insulin and are furthermore unstable. Further experiments have disclosed that the cause of this must be ascribed to the common buffers, which are found to interfere with the chemical process between metal and insulin. As it is requisite for the protracted biological effect that the insulin is made heavily soluble at neutral reaction of the blood, it is thus necessary to be conversant with possible factors, which have influence on or may completely neutralize the forming of the heavily soluble amorphous insulin.

The most common buffer, phosphate, is thus useless except in preparations based on nickel. Citrate buffers are useless together with any of the metals. Suitable buffers will be mentioned below.

The chemical process between insulin and metal, causing the protracted biological effect, is in other words very sensitive toward even small admixtures of other substances.

In choosing admixtures, such as buffering substances, isotonics and preserving agents, it must therefore be ensured that the substances in question in the desired concentrations do not exhibit a greater affinity to the metal employed than the insulin does, so that the bond between insulin and metal ion, which is a prerequisite for the retarded biological effect, is prevented.

(4) According to the invention it has furthermore been found that precipitates of amorphous insulin in the presence of the mentioned metals are only stable within a quite definite pH range and dependable on how much insulin is present in dissolved state. If the pH value is not kept within a quite definite, narrow range, and if precautions are not taken to ensure that only a very slight amount of insulin is present in dissolved state, the amorphously precipitated insulin will by standing be transformed into crystalline insulin. In order to avoid transformation into crystalline insulin the pH value should lie between approximately 6–6.5 and approximately 8.5. In this pH range at any rate below 2% of the insulin present will also be in solution.

When the lower pH limit is specified at approximately 6–6.5, the reason is that the lower limit is dependent on the amount present of the mentioned metals so that a lower pH value may be used with increasing amount of metal. If, for example, the zinc content is 5 gamma per insulin unit or more, then it will be possible to go down to approximately 6 without danger of crystallization, while at 2 gamma per insulin unit it will only be possible to go down to approximately 6.5.

Buffering substances may be used to ensure maintenance of the pH value within the mentioned range. This should especially be taken into consideration when a pH value is employed near to the above mentioned lower limit at approximately 6–6.5, where a slight decrease in pH entails danger of crystallization of the amorphous insulin.

In conformity with above observations the process according to the invention is characteristic in that a suspension of amorphous insulin is produced in an aqueous suspension medium in the presence of one or more of such metals as zinc, cobalt, nickel, cadmium, copper, manganese and iron in such a concentration that the finished suspension will contain above approximately $2 \times A \times 10^{-5}$ milliequivalents of the mentioned metals per millilitre of the suspension, where "A" denotes the number of international units of insulin per millilitre of the suspension, and that the suspension is given a pH value of approximately 6 to approximately 8.5, at the same time avoiding the presence of such ions, which, at neutral reaction, have a greater affinity to the mentioned metals than insulin has, whereby less than 2% of the insulin present in the suspension will be found in dissolved state.

Clinical tests have shown that it is possible in this manner to arrive at injectable insulin preparations, which exhibit a protracted effect of 24 hours and more, and which in most cases give a better utilization of the injected insulin than do the known insulin preparations with a corresponding protracting degree, which means a saving of insulin.

The clinical effect obtained is absolutely reproduceable, even after the produced preparations have been kept for a long time. The reason for this is combined with the pH value of the preparations and the slight amount of insulin in solution, which prevents the amorphous insulin from being converted into crystalline insulin by standing such a conversion of the amorphous insulin into crystalline insulin would in fact result in a considerable change of the protracted effect of the preparations.

In the practical diabetes therapeutic it is of great importance to provide insulin preparations having such a therapeutical effect that it will be sufficient with one injection per day in the great majority of diabetes cases. It has proved that the need for such preparations may be covered by insulin preparations, produced according to the invention, with a metal content of approximately $3 \times A \times 10^{-5}$ to approximately $18 \times A \times 10^{-5}$ milliequivalents per millilitre, in case of zinc corresponding to from approximately 1 to approximately 6 gamma per insulin unit. Using one injection per day it will be possible with preparations of this composition to obtain a suitable insulin supply during the morning and noon hours at the same time as sufficient insulin will be present to cover the insulin consumption during the evening and the night.

In conformity with the above the process according to the invention is furthermore characteristic in that the aqueous suspension of the amorphous insulin is given a content of one or more of the mentioned metals of approximately $3 \times A \times 10^{-5}$ to approximately $18 \times A \times 10^{-5}$ milliequivalents per millilitre, "A" denoting the number of international units of insulin per milliliter of the suspension.

This makes it possible, without employment of substances foreign to the organism, to arrive at insulin preparations possessing a particularly suitable protracting degree, and being superior to the known insulin preparations as regards the utilization of the injected amount of insulin, and consequently as regards the patient's adjustment on the preparation.

If the insulin employed as starting material only contains a small amount of metal, an aqueous suspension medium is employed, which contains in itself one or more of the metals in question in a combined amount per millilitre of above approximately $2 \times A \times 10^{-5}$ milliequivalents.

As it is of importance that the pH value of the produced preparations is retained between approximately 6 and approximately 8.5 also after they have been kept for a longer time, it is expedient to employ one or more buffering substances for maintaining the pH value used. In choosing the buffer it should be ensured that the buffering substance does not supply the aqueous suspension medium with anions, which have greater affinity to the metal or to those metals present in the suspension than has insulin. As examples of employable buffering substances may be mentioned acetate buffer, borate buffer, diethyl barbiturate buffer and maleate buffer as well as phosphate buffer, which, however, may only be employed when the protracting degree of the preparation is based on the presence of nickel.

According to the invention it is furthermore advantageous that the aqueous suspension medium has or is given a pH value of approximately 7. This gives the resultant preparations the same acidity as the blood and fluids of the tissues in the human organism. At this pH value the amorphous insulin is also most heavily soluble, and consequently, the suspensions produced most stable.

For clinical reasons it is preferred to employ isotonic suspension media. Substances as glucose, sodium chloride or glycerine may be used for making aqueous media isotonic. However, these substances are only to be regarded by the way of examples. Other examples will be apparent from the accessible literature in this field.

With a view of the stability of the insulin preparations it is furthermore advantageous to add one or more of the preserving agents ordinarily used for injection liquids. Methyl-p-hydroxy benzoate (nipagin) and propyl-p-hydroxy benzoate as well as phenyl mercuric acetate are examples of such preserving agents.

The process according to the invention may be performed by admixing the employed starting materials (amorphous insulin, metal compound, distilled water and if desired buffering substance, isotonic and preserving agent) in any sequence, and by adjusting, if necessary, the pH value of the produced composition to approximately 6 to approximately 8.5, working under aseptic conditions if the starting materials are in a sterile condition, for example in form of sterile solution, while ensuring, should the performance of the process result in a non-sterile insulin-containing mixture, that the insulin will be present in dissolved state, and inserting a sterilization, for example a germ filtration, prior to precipitation of the insulin under aseptic conditions, and using succeeding admixtures, if any, in sterile form.

As metal compound may be employed an inorganic or organic salt, such as chloride, sulphate, nitrate or acetate, or a hydroxide, oxide or a complex metal compound, which, when admixed, will be present in such a condition that the metal can be taken up by the insulin.

Crystalline insulin may be employed as starting material instead of amorphous insulin, but in that case it is an absolute prerequisite that the crystalline insulin is brought into solution while the process is being performed.

Furthermore, it is most advantageous that the insulin is used in form of an acid solution of amorphous or crystalline insulin, so that precipitation of the amorphous insulin is produced during the preparation itself. Hereby the most favourable physical properties of the precipitate will be obtained.

In a preferred embodiment of the process an acid insulin solution is mixed with a solution of the other starting materials except buffering substances, after which a germ filtration is performed, and a sterilized solution of buffering substances and, if desired, pH adjusting substances are then added under aseptic conditions for providing a pH value of between approximately 6 and approximately 8.5.

As has previously been mentioned amorphous insulin is able to take up varying amounts of the mentioned metals. Therefore, in the process according to the invention the proceeding may also be that amorphous insulin with such a content of the metals in question is employed that the content of metal of the finished suspension is derived completely or partly from the amorphous insulin used. In that case the amorphous insulin has expediently a metal content of over approximately 0.4 milliequivalent per gram.

Instead of amorphous insulin with such a metal content that the metal content of the finished suspension is completely or partly derived from the amorphous insulin employed, crystalline insulin with a corresponding metal content may also be used, but in that case the crystalline insulin must be present in dissolved state or must be brought into solution during the preparation for subsequent precipitation in amorphous state.

To further illustrate the process according to the invention reference is made to below mentioned examples showing various embodiments, but to which the invention is not limited.

When solutions of the various starting materials are employed in carrying out the process according to the invention, it will also be possible to proceed by producing a number of sterile stock solutions, which are used as a basis for production of various preparations by admixing of the basic solution under aseptic conditions. For example, the following basic solution may be produced:

*Stock solution I.*—2.18 grams of recrystallized insulin are dissolved in 25 millilitres 0.1 n hydrochloric acid, and distilled water to a volume of 125 millilitres is added.

*Stock solution II.*—To 20 millilitres of an aqueous zinc chloride solution containing 1% zinc is added distilled water to a volume of 125 millilitres.

*Stock solution III.*—To 10 millilitres of an aqueous cupric chloride solution containing 1% copper is added distilled water to a volume of 100 millilitres.

*Stock solution IV.*—To 10 millilitres of an aqueous nickel chloride solution containing 1% nickel is added distilled water to a volume of 100 millilitres.

*Stock solution V.*—1.36 grams of sodium acetate with 3 mol crystal water are dissolved in distilled water to a volume of 100 millilitres.

*Stock solution VI.*—1.16 grams of maleic acid are dissolved in distilled water to a volume of 100 millilitres.

*Stock solution VII.*—2.06 grams of sodium diethyl barbiturate are dissolved in distilled water to a volume of 100 millilitres.

*Stock solution VIII.*—0.95 gram of borax is dissolved in distilled water to a volume of 100 millilitres.

*Stock solution IX.*—3.58 grams of secondary sodium phosphate with 12 mol crystal water are dissolved in distilled water to a volume of 100 millilitres.

Example 1

1.3 millilitres of glycerine are mixed with 0.5 millilitre of a 25% solution of nipagin in ethanol, and 50 millilitres of distilled water are added. To the produced mixture are, after sterile filtration, added 10 millilitres of the stock solution I, 2.5 millilitres of the stock solution II and 10 millilitres of the stock solution V, after which 3.0 millilitres of sterile 0.1 n sodium hydroxide are added, and the mixture is filled up with sterile distilled water to a volume of 100 millilitres.

The insulin will be precipitated amorphously by the admixture of the sodium hydroxide, and the produced suspension acquires the pH value 7. It will contain approximately 1 gamma zinc per insulin unit.

Example 2

The proceeding is as in Example 1, however, double the amount of the stock solution II being employed with the result that the produced suspension of amorphous insulin will contain approximately 2 gamma zinc per insulin unit.

Example 3

The proceeding is as in Example 1, however, 10 millilitres of the stock solution II and 3.4 millilitres sterile 0.1 n sodium hydroxide being employed. The suspension of amorphous insulin thus produced will also have the pH value 7, but contain approximately 4 gamma zinc per insulin unit.

Example 4

The proceeding is as mentioned in Example 3, however, an admixture of 2.7 millilitres of sterile 0.1 n sodium hydroxide being employed, with the result that the produced suspension of amorphous insulin will have the pH value 6.

Example 5

1.3 millilitres of glycerine are mixed with 0.5 millilitre of a 25% solution of nipagin in ethanol, and 50 millilitres of distilled water are added. To the produced mixture are, after sterile filtration, added 10 millilitres of the stock solution I, 5 millilitres of the stock solution II and 10 millilitres of the stock solution VI, after which 21.4 millilitres of sterile 0.1 n sodium hydroxide are added, and the mixture is diluted with sterile distilled water to a volume of 100 millilitres. The suspension formed of amorphous insulin has a pH value of 7 and contains approximately 2 gamma zinc per insulin unit.

Example 6

The proceeding is as mentioned in Example 5, however, 10 millilitres of the stock solution VII being employed instead of 10 millilitres of the stock solution VI, and 4.5 millilitres of sterile 0.1 n hydrochloric acid instead of 21.4 millilitres of sodium hydroxide.

The produced suspension of amorphous insulin has the pH value 7 and contains approximately 2 gamma zinc per insulin unit.

*Example 7*

The proceeding is as mentioned in Example 5, however, 10 millilitres of the stock solution VIII being employed instead of 10 millilitres of the stock solution VI, and 0.9 millilitre of sterile 0.1 n hydrochloric acid instead of 21.4 millilitres of sodium hydroxide.

The produced suspension of amorphous insulin has the pH value 7 and a zinc content of approximately 2 gamma per insulin unit.

*Example 8*

1.3 millilitres of glycerine are mixed with 0.5 millilitre of a 25% solution of nipagin in ethanol, and 50 millilitres of distilled water are added.

10 millilitres of the stock solution I, 10 millilitres of the stock solution III and 10 millilitres of the stock solution VII are added to the produced mixture after sterile filtration, after which 3.4 millilitres of sterile 0.1 n hydrochloric acid are added, and the mixture is diluted with sterile distilled water to a volume of 100 millilitres.

The thus produced suspension of amorphous insulin has the pH value 7, and contains approximately 2.5 gamma copper per insulin unit.

*Example 9*

1.3 millilitres of glycerine are mixed with 0.5 millilitre of a 25% solution of nipagin in ethanol, and 50 millilitres of distilled water are added. 10 millilitres of the stock solution I, 10 millilitres of the stock solution IV and 10 millilitres of the stock solution IX are added to the produced mixture after autoclaving, after which 0.5 millilitre of sterile 0.1 n hydrochloric acid is added, and the mixture diluted with sterile distilled water to a volume of 100 millilitres.

The produced suspension of amorphous insulin has the pH value 7, and contains approximately 2.5 gamma nickel per insulin unit.

*Example 10*

174 milligrams of crystalline insulin are suspended in 2.5 millilitres of a zinc chloride solution containing 0.16% $Zn^{++}$, and dissolved by an admixture of 10 millilitres of 0.02 n HCl. 1.3 millilitres of glycerine as isotonic and 0.5 millilitre 25% spirit of nipagin as a preserving agent are then added, after which dilution with water to a volume of 87 millilitres takes place, and the solution is sterile filtrated. 10 millilitres of an autoclaved buffer, containing 1.36% Na-acetate, $3H_2O$ are then added, after which pH is adjusted to 7 with 3 millilitres of sterile 0.1 n NaOH. The resultant product is a suspension of amorphous insulin of the same composition as according to Example 1.

*Example 11*

174 milligrams of crystalline insulin are dissolved in 10 millilitres 0.02 n HCl. The following solution is then added:

1.3 millilitres of glycerol
0.5 millilitre of 25% spirit of nipagin
8 milligrams Zn (as chloride) plus
Distilled water to 80 millilitres The mixture is sterile filtrated, after which an autoclaved mixture consisting of:

3.0 millilitres of 0.1 n NaOH
136 milligrams of Na-acetate, $3H_2O$ plus
Water to 10 millilitres is added.

The suspension of amorphous insulin thus produced has the same composition as the suspension according to Example 2.

*Example 12*

174 milligrams of crystalline insulin are dissolved in 10 millilitres 0.02 n HCl containing 16 milligrams Zn as chloride, and the solution is sterile filtrated. A solution containing:

136 milligrams of Na-acetate, $3H_2O$
1.3 millilitres of glycerol
0.5 millilitre of 25% spirit of nipagin
3.4 millilitres of 0.1 n NaOH plus
Water to 90 millilitres is then prepared. This solution is also sterile filtrated, after which the two sterile filtrated solutions are mixed under aseptic conditions.

The preparation thus produced has the same composition as according to Example 3.

*Example 13*

4000 international units of amorphous insulin are suspended in 10 millilitres of a zinc chloride solution, containing 0.16% $Zn^{++}$. It is then dissolved by admixture of 10 millilitres 0.1 n HCl. As an isotonic are added 1.3 millilitres of glycerol and as a preserving agent 0.5 millilitre of 25% spirit of nipagin. Diluting with water to 90 millilitre and sterile filtration then take place, after which 10 millilitres of autoclaved 0.1 n NaOH containing 136 milligrams of Na-acetate, $3H_2O$ are added. Finally pH is adjusted to 6 with 0.07 millilitre of sterile 1 n NaOH.

Through this process is a preparation obtained of the same composition as according to Example 4.

*Example 14*

4000 international units of amorphous insulin are suspended in 5 millilitres of a zinc chloride solution, containing 0.16% zinc, and dissolved with 3 millilitres 0.02 n HCl and 10 millilitres of 1.16% maleic acid solution. 1.3 millilitres of glycerol, 0.5 millilitre of 25% spirit of nipagin as well as water to 80 millilitres are then added. The solution is sterile filtrated, after which the pH is adjusted to 7 with 20 millilitres of sterile 0.1 n NaOH.

The preparation thus produced has the same composition as according to Example 5.

*Example 15*

4000 international units of sterile amorphous insulin are suspended in below mentioned sterile filtrated suspension medium:

8 milligrams of zinc (as chloride)
206 milligrams of sodium diethyl barbiturate
1.3 millilitres of glycerol
0.5 millilitre of 25% spirit of nipagin
6.5 millilitres 0.1 n HCl plus
Water to 100 millilitres The suspension of amorphous insulin thus produced has the pH value 7 and contains approximately 2 gamma zinc per insulin unit.

*Example 16*

4000 international units of sterile amorphous insulin are suspended in below mentioned sterile filtrated suspension medium:

8 milligrams of zinc (as chloride)
95 milligrams of borax
1.3 millilitres of glycerol
0.5 millilitre of 25% spirit of nipagin
2.9 millilitres 0.1 n HCl plus
Water to 100 millilitres The preparation thus produced has the same composition as according to Example 7.

Example 17

4000 international units of amorphous insulin are dissolved in a solution consisting of:

10 milligrams of copper (as chloride)
5.4 millilitres 0.1 n HCl
1.3 millilitres of glycerol
0.5 millilitre of 25% spirit of nipagin plus
Water to 90 millilitres The solution is sterile filtrated, after which 10 millilitres of a sterile 2.06% sodium diethyl barbiturate solution are added.

The resultant suspension of amorphous insulin has the same composition as according to Example 8.

Example 18

174 milligrams of crystalline insulin are suspended in 10 millilitres of a nickel chloride solution containing 0.1% of nickel, and dissolved with 2.5 millilitres 0.1 n HCl. 1.3 millilitres of glycerol and 0.5 millilitre of 25% spirit of nipagin are then added and diluted with water to 95 millilitres. The solution is sterile filtrated, after which 5 millilitres of autoclaved buffer containing 358 milligrams of $Na_2HPO_4, 12H_2O$ are added.

The preparation thus produced has the same composition as according to Example 9.

Example 19

200 milligrams of amorphous insulin (20 international units/milligram) containing 2.3% zinc, are mixed with:

2.5 millilitres of a $ZnCl_2$ solution containing 0.16% zinc
3 millilitres 0.02 n HCl
1.3 millilitres of glycerol
0.5 millilitre of 25% spirit of nipagin
10 millilitres of 1.16% maleic acid plus
Water to 80 millilitres The solution is sterile filtrated, after which pH is adjusted to 7 with 20 millilitres of sterile 0.1 n NaOH. The preparation has the same composition as in Examples 14 and 5.

Example 20

200 milligrams of amorphous insulin (20 international units/milligram) containing 5% $Cu^{++}$ are mixed with:

5.4 millilitres of 0.1 n HCl
1.3 millilitres of glycerol
0.5 millilitre of spirit of nipagin plus
Water to 90 millilitres The produced insulin solution is sterile filtrated, after which pH is adjusted to 7 with 10 millilitres of a sterile 2.06% sodium diethyl barbiturate solution, causing the insulin to be amorphously precipitated. The preparation has the same composition as in Examples 17 and 8.

Example 21

174 milligrams of crystalline insulin, containing 2.7% Zn, are brought into solution in 10 millilitres of 1.16% maleic acid
1.3 millilitres of glycerol
0.5 millilitre of 25% spirit of nipagin
0.8 millilitre 0.1 n HCl plus
Water to 80 millilitres The solution is sterile filtrated, after which pH is raised to 7 with 20 millilitres of sterile 0.1 n NaOH, causing the insulin to be amorphously precipitated. The insulin suspension produced has pH 7 and contains approximately 1 gamma zinc per insulin unit.

Having thus fully described our invention we claim as new and desire to secure by Letter Patent:

1. An injectable insulin preparation having a protracted effect consisting essentially of a sterile aqueous suspension of amorphous insulin obtained by precipitation of dissolved zinc insulin, said suspension having a pH value of 6.5 to 8.5 and having a zinc content of 1 to 6 gamma per insulin unit, and said suspension being substantially free from buffer ions which have a greater affinity for the zinc ions than does insulin and thereby bind the zinc at pH 7, less than 2% of the insulin present in the suspension being in dissolved state.

2. An injectable insulin preparation as defined in claim 1, wherein the suspension has a pH-value of about 7.

3. An injectable insulin preparation having a protracted effect consisting essentially of a sterile aqueous suspension of amorphous insulin obtained by precipitation of dissolved zinc-insulin, the aqueous suspension medium containing a preservative selected from the group consisting of methyl-para-hydroxybenzoate, propyl-para-hydroxybenzoate and phenyl mercuric acetate, and a buffer selected from the group consisting of acetates, borates, diethylbarbiturates and maleates, said suspension having a pH-value between 6.5 and 8.5 and a zinc content of 1 to 6 gamma per insulin unit, and the suspension being substantially free from buffer ions which have a greater affinity for the zinc ions than does insulin and thereby bind the zinc at pH 7, less than 2% of the insulin present in the suspension being found in dissolved state.

4. An injectable insulin preparation having a protracted effect consisting essentially of a sterile suspension of amorphous insulin derived from crystals of zinc insulin in an aqueous suspension medium containing methyl-para-hydroxybenzoate as a preservative and sodium acetate as a buffer, said suspension having a pH-value of about 7, and a zinc content of 2 gamma per insulin unit, less than 2% of the insulin present in the suspension being found in dissolved state.

References Cited in the file of this patent

UNITED STATES PATENTS

| Number | Name | Date |
|---|---|---|
| 2,143,590 | Scott | Jan. 10, 1939 |
| 2,143,591 | Scott | Jan. 10, 1939 |
| 2,174,862 | Sahyun | Oct. 3, 1939 |
| 2,192,386 | Sahyun et al. | Mar. 5, 1940 |
| 2,354,211 | Lang | July 25, 1944 |
| 2,449,076 | Lautenschlager | Sept. 14, 1948 |

FOREIGN PATENTS

| Number | Country | Date |
|---|---|---|
| 45,480 | Netherlands | Apr. 15, 1939 |
| 643,300 | Great Britain | Sept. 15, 1950 |
| 102,130 | Australia | Sept. 24, 1937 |

OTHER REFERENCES

Sahyun: Am. J. of Physiology, vol. 125, No. 1, January 1939, pp. 24–30.

Blatherwick: The Am. J. of Physiol., vol. 121, No. 1, 1938, pp. 44–48.

Rabinowitz: The Canadian Med. Asso. J., vol. 35, No. 3, September 1936, pp. 239–252.

Cohn: J.A.C.S., vol. 63, January 1941, pp. 17–21.

Ind. and Eng. Chem., vol. 32, No. 7, 1940, pp. 908–910.

Physician's Bull., March to April 1937, pp. 4–5 relied on.